Patented Aug. 21, 1934

1,970,909

UNITED STATES PATENT OFFICE 1,970,909

ANTHRAQUINONE COMPOUND

Ivan Gubelmann, Wilmington, Del., Henry J. Weiland, South Milwaukee, Wis., and Hans Billroth Gottlieb, Chicago Heights, Ill., assignors to E. I. du Pont de Nemours and Company, Wilmington, Del., a corporation of Delaware No Drawing. Application December 1, 1933, Serial No. 700,617

2 Claims. (Cl. 260—60)

This invention relates to 1-amino-2-chloro-4-methyl-anthraquinone as a new compound and to a process for preparing the same. It has for its object to provide a simple and economical method for making 1-amino-2-chloro-4-methyl-anthraquinone, thereby rendering it available for use as an intermediate in the preparation of dyestuffs.

We have found that 2'-methyl-4'-chloro-5'-amino-o-benzoyl-benzoic acid, which has been described in our copending application Ser. No. 700,616, filed of even date herewith, under certain conditions loses one molecule of water and ring-closes to form 1-amino-2-chloro-4-methyl-anthraquinone. The elimination of water may be brought about by suitable dehydrating agents such as sulfuric acid.

The actual conditions for carrying out this reaction have been found to be rather limited; for example, the use of too strong sulfuric acid, or prolonged heating of the compound after ring-closing, results in decomposition and yields dark tarry products.

In carrying out the "ring-closure" under the conditions given in the example, a satisfactory yield of good product is obtained. The parts used are by weight.

Example

To 2500 parts of sulfuric acid 96% at 120° C. are dissolved 289.5 parts of 2'-methyl-4'-chloro-5'-amino-o-benzoyl-benzoic acid. The temperature is then raised to 160° C. and held at 160° C. for about 10 minutes. At temperatures below 150° C. the reaction proceeds very slowly, whereas at temperatures above 180° C. the decomposition is very rapid. The ring-closing mass is of a bluish green color. The "ring-closed" mass is now poured upon ice and water and stirred for 2 hours. It is then filtered and washed with cold water till practically free of sulfuric acid.

This product is a yellowish red powder, the crystals of which have a copper luster before grinding. It is quite insoluble in the lower boiling solvents. It is quite soluble in nitrobenzene but should not be heated over 180° C., otherwise some decomposition is effected. It can be recrystallized from aniline in the form of beautiful needles. With sodium hydroxide and sodium hydrosulfite solution it gives a brownish colored vat.

What we claim is:

1. 1-amino-2-chloro-4-methyl-anthraquinone.
2. In the process for preparing 1-amino-2-chloro-4-methyl-anthraquinone, the step which comprises heating 2'-methyl-4'-chloro-5'-amino-o-benzoyl-benzoic acid in sulfuric acid of about 96% concentration at temperatures of from 150° to 180° C.

IVAN GUBELMANN.
HENRY J. WEILAND.
HANS BILLROTH GOTTLIEB.